United States Patent [19]

Bilbrey

[11] Patent Number: 5,241,389
[45] Date of Patent: Aug. 31, 1993

[54] VIDEO DISPLAY SYSTEM PROVIDING FOR SYNCHRONIZATION OF MULTIPLE VIDEO DATA STREAMS

[75] Inventor: Brett C. Bilbrey, Hoffman Estates, Ill.

[73] Assignee: Intelligent Resources Integrated Systems, Inc., Arlington Heights, Ill.

[21] Appl. No.: 737,406

[22] Filed: Jul. 29, 1991

[51] Int. Cl.⁵ .............................................. H04N 5/14
[52] U.S. Cl. .................................... 358/181; 358/160
[58] Field of Search ................. 358/181, 160, 149, 22, 358/183, 185

[56] References Cited

U.S. PATENT DOCUMENTS 4,797,740 1/1989 Harasaki et al. ..................... 358/133
4,858,011 8/1989 Jackson et al. ...................... 358/181
4,942,470 7/1990 Nishitani et al. ..................... 358/160

Primary Examiner—James J. Groody
Assistant Examiner—Glen Burgess
Attorney, Agent, or Firm—Sitrick & Sitrick

[57] ABSTRACT

A video display system is provided which compensates for video processing delays in multiple, inter-coupled video processing subsystems. The video display system is comprised of multiple video processing subsystems, each having a video bus for coupling video data between individual ones of the multiple subsystems. Each subsystem is adapted to receive one or more video data inputs and to selectively and programmably process the one or more video data inputs to provide a video data output. Each subsystem is comprised of a video delay subsystem coupled to an external video source and to the video bus. The video delay subsystem adds a programmable time delay to its respective external video source input data prior to coupling it to its respective processor for processing of video data contained within that respective video processing subsystem. The programmable delay adequately compensates and time correlates its external video source input and the video bus coupled video input prior to providing those data signals to be selectively processed (blend, fade, mix, etc.) to provide its respective video data output, responsive to control signals received from either the video bus or the main computer bus. The external video source can be any of a number of video sources. Video data output from a first subsystem is coupled via the video bus to one or more other subsystems. The video bus couples video data and control signals amongst the multiple video processing subsystems.

31 Claims, 19 Drawing Sheets

MASK EXAMPLE

| CLK | I DATA (31:0) |
|---|---|
| 0 | FFF3100FF |
| 1 | 00000000 |
| 2 | 000000AF |
| 3 | 00000004 |
| 4 | 0000000F |
| 5 | 00000003 |
| 6 | 0000000F |
| 7 | 00000002 |

305 → 32 → CONTROL 0000003FFFFFFC0C0 310 and 325 → 32 → 315

| CLK | O DATA (0:31) |
|---|---|
| 0 | FFFFFF03 |
| 1 | FFFFFF00 |
| 2 | FFFFFF03 |
| 3 | FFFFFF00 |
| 4 | FFFFFF03 |
| 5 | FFFFFF 03 |
| 6 | FFFFFF03 |
| 7 | FFFFFF02 |

CONTROL (5:0) DELAY = 0

CONTROL (37:6) (ZERO) MASK = FFFFFF03
CONTROL (69:38)(ONE) MASK = 000000FF

FIG. 11

VIDEO DISPLAY SYSTEM PROVIDING FOR SYNCHRONIZATION OF MULTIPLE VIDEO DATA STREAMS

BACKGROUND OF THE INVENTION

This invention relates to video display systems and more particularly to a system and methodology for synchronizing multiple video signals of multiple sources to compensate for time and processing delays of multiple video subsystems of the display system.

In a video display system having multiple video input sources or having a video input source which is processed and recombined with itself, the processing of the video data signal injects a finite time delay which could, if uncorrected, cause the resulting processed combinational video output signal to be erroneous and not the desired combinational result. For example, in the Video Explorer video processing system, from Intelligent Resources Integrated Systems, Inc., multiple video processing boards or systems can be interconnected by means of a video bus, each board being capable of receiving a separate input source and capable of providing a separate video output, both independent of the video bus. See copending U.S. patent application, Ser. No. 07/564,148, assigned to the assignee of the present invention, for details. In this system, there is a multiple pixel clock time delay between the video source input to a particular Video Explorer processing board system, and the output from that video processing system via its video bus connector. Where multiple Video Explorer processing board systems are coupled one to the next via the video bus, and where multiple external video input sources are connected, one to each board, the video processing system causes a time delay, between (1) the external video input video source to a subsequent video board and (2) the video data output from the previous video board coupled via the video bus as video data input, relative to the previous video board's external video source input. Thus, if multiple video processing boards are intercoupled, and combinationally process video signals through multiple video board systems, the results will be unacceptable as the various video inputs and processed intermediate results will be unsynchronized. Furthermore, where there are multiple video processing subsystems in the overall system, the delay added to the video source inputs by each subsequent board in the overall system, the delay increases cumulatively for all video processing delays introduced by previous video processing boards in the system. Prior solutions to video processing delay synchronization have been to utilize fixed or hard-wired delay lines or their equivalents. This is both inflexible, non-variable and for many applications ineffective. Additionally, it limits the flexibility and versatility of the overall video processing system.

It is therefore an object of the present invention to provide a video delay synchronization system for synchronizing multiple video processing subsystems which provides flexibility and adaptability for various functionality and delays.

It is a further object of the present invention to provide a time delay synchronization system for video signals which is selectively programmable and adaptable in real time.

It is a further object of the present invention to provide for an adaptive sychronization system for video signals which synchronizes external video sources with internal video bus signals to allow for their interactive combination and processing.

It is a further object of the present invention to additionally provide real-time programmable adaptive input masking.

SUMMARY OF THE INVENTION

In accordance with the teachings of the present invention, a video display system is provided which compensates for video processing delays in multiple, intercoupled video processing subsystems. The video display system is comprised of multiple video processing subsystems, each having a video bus for coupling video data between individual ones of the multiple video processing subsystems. Each video processing subsystem is adapted to receive one or more video data inputs and to selectively and programmably process the one or more video data inputs to provide a video data output. Each of the multiple video processing subsystems is comprised of video delay means, coupled to an external video source and to the video bus. The external video source can be any of a number of video sources, including, but not limited to, live video camera feed, video tape recorder, video laser disc player, etc. The video display system is further characterized in that video data is output from a first video processing subsystem and is coupled via the video bus to at least one other video processing subsystem. The coupling is accomplished via the video bus which couples video data and control signals amongst the multiple video processing subsystems. Each video processing subsystem requires a processing time delay between the video input data and the corresponding video output data for that video processing subsystem. The video delay means is further comprised of programmable delay means for adding a time delay to the respective external video source input data prior to coupling it to the means for processing of video data contained within that respective video processing subsystem. Thus, for the individual video processing subsystem, the programmable delay means provides means for adequately compensating and time correlating the external video source input data signal and the video bus coupled video input data signal prior to providing those data signals to the means for processing the video data to selectively process (blend, fade, mix, etc.) the video input data signals to provide a video data output, responsive to control signals received from either the video bus or the main computer bus. Furthermore, the delay of the video delay means can compensate for multiple card video processing subsystems processing delays so as to time-correlate the outputs of the external video sources and the respective corresponding video bus input for the respective video processing subsystems, prior to providing these video data signals to the means for processing of video data for the respective video processing subsystem. In an alternative embodiment, each video processing subsystem's video delay means includes a programmable input mask subsystem for selectively masking input video data signals.

BRIEF DESCRIPTION OF THE DRAWINGS

The present invention will be more clearly understood by reference to the drawings in conjunction with the detail description of the drawings, wherein.

DETAILED DESCRIPTION OF THE DRAWINGS

Figure 1:
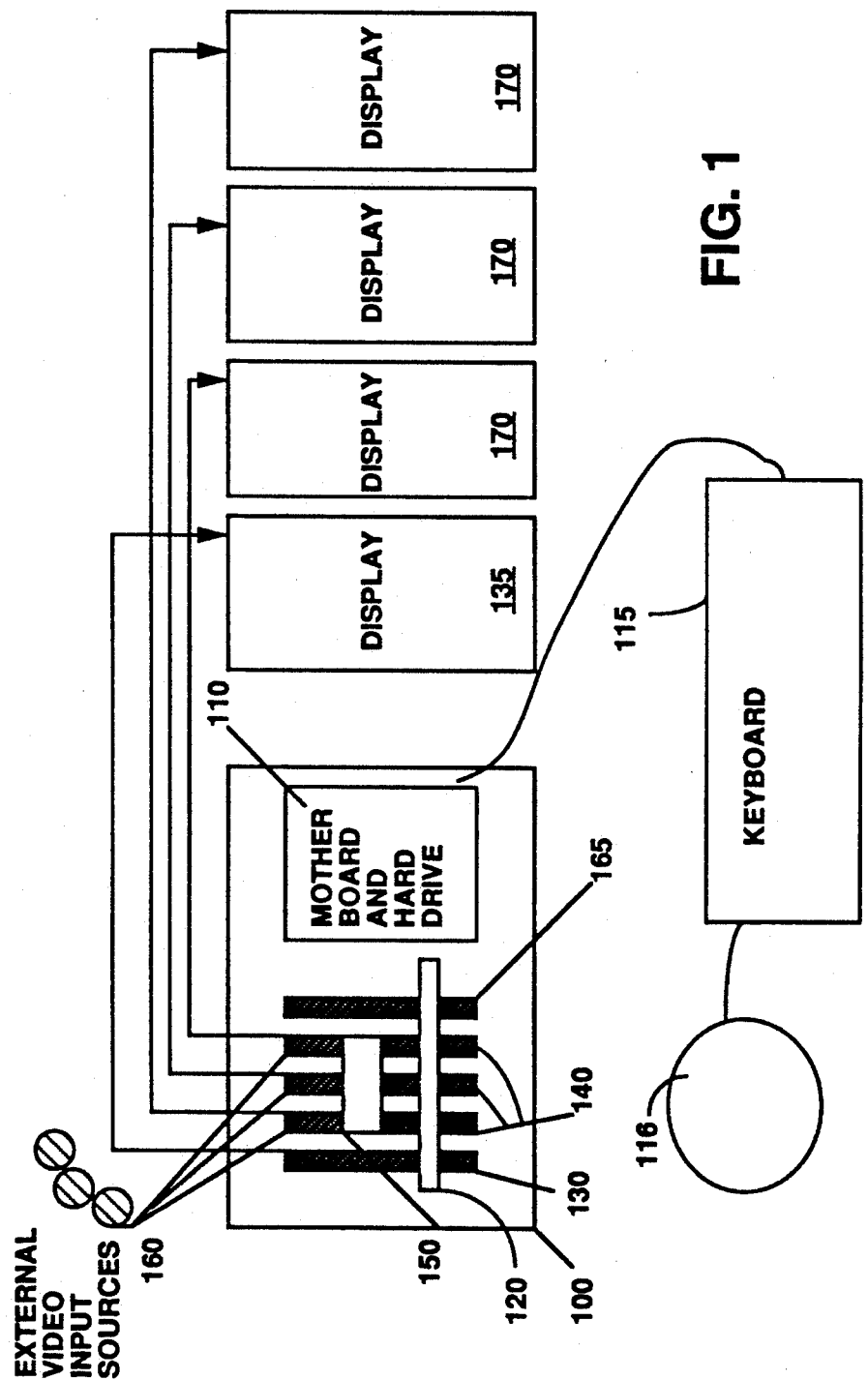
FIG. 1 is an overall systems block diagram including the video display system of the present invention.

Referring to FIG. 1, an overall system block diagram of a video display system in accordance with the present invention is illustrated. A main computer 100, illustrated as an Apple MAC II computer is comprised of a mother board and main computing system 110, including processing, memory and offline storage such as disk drives, etc., and is further comprised of multiple video boards coupled to a main computer interface bus 120, which is a NUBUS interface bus in the MAC II. The MAC II is commercially available from Apple Computer. The computer interface bus 120 permits communication and control interface with systems coupled thereto, such as the main computer 100, the video processing subsystem cards 140, the video display card 130 and the Ethernet card 165.

As illustrated in FIG. 1, the computer 100 is also coupled to a computer keyboard 115 and a pointing device 116. For the MAC II, the pointing device can be a mouse or track ball, stylus tablet, etc. The interface BUS 120 has coupled thereto multiple plug-in cards, such as a standard video display card 130, which drives the main computer display, 135. Additionally, multiple video processing subsystems cards, 140, are coupled to the main computer BUS 120, each being additionally interconnected by a separate video BUS 150, each further being coupled to external video source inputs 160. Each video processing subsystem 140 is illustrated as being coupled to a video display 170. The video display 170 can be any commercially available high quality, high resolution display monitor, such as are available from Apple, Sony, Radius, Supermac, Mitsubishi, etc. For purposes of illustration, an Ethernet network card 165 is also shown coupled to the NUBUS 120, adapted to be coupled to an Ethernet network via an Ethernet cable. Any compatible video display card 130 and computer display 135 is acceptable, such as are available from numerous companies, including Apple Computer.

Video Processing Subsystem Cards 140 can be obtained from Intelligent Resources.

Figure 2:
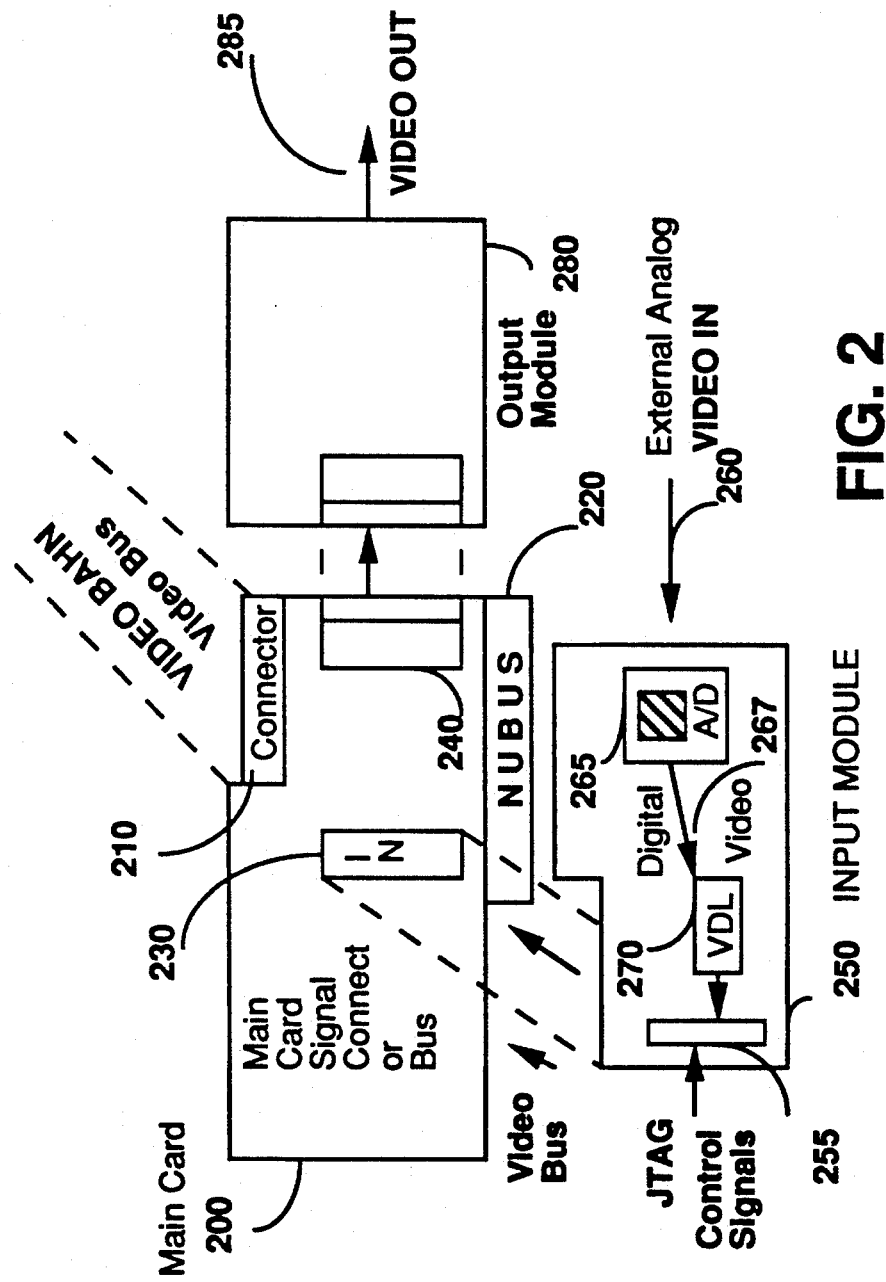
FIG. 2 is a detailed block diagram of an individual video processing subsystem.

Referring to FIG. 2, a detailed block diagram of an individual video processing subsystem 140 of FIG. 1 is illustrated. A main card 200 has a video BUS main connector 210 for coupling to additional video processing subsystems, a system bus, NUBUS bus, connector 220, a video BUS input module connector 230, and an output module connector 240.

An input module 250 is coupled via its main card signal connector 255 to the main card 200 via the main card's connector 230. An external video input signal 260, illustrated as an external analog video input, is coupled to the input module 250, and is coupled therewithin to an analog to digital convertor 265 which converts the external analog video input signal 260 to a digital video input signal 267. In an alternative embodiment, direct digital video input can be provided, and the analog to digital conversion subsystem 265 is not required or present on the input module. The digital video input signal 267 is coupled to the video delay and masking subsystem 270 which provides video signal delay and masking functions as described hereinafter. The video delay system 270 provides a video data output 272 which is coupled to the video bus main card connector 255. The video delay subsystem is described in greater detail with reference to FIGS. 4-11.

The external video input signal 260 to the input module can be from any of multiple sources, such as a video cassette recorder, laser disk, video camera, still camera, computer output, etc., and can also be in any of multiple formats including NTSC, SECAM, PAL, RGB, Composite Video, etc. The main card 200 is coupled to an output module 280 via the output connector 240. The output module 280 provides necessary processing and conversion to provide a video output signal 285, which can be output in multiple formats for coupling to various video display systems, such as NTSC format, RGB, Composite Video, PAL, SECAM, etc.

Figure 3:
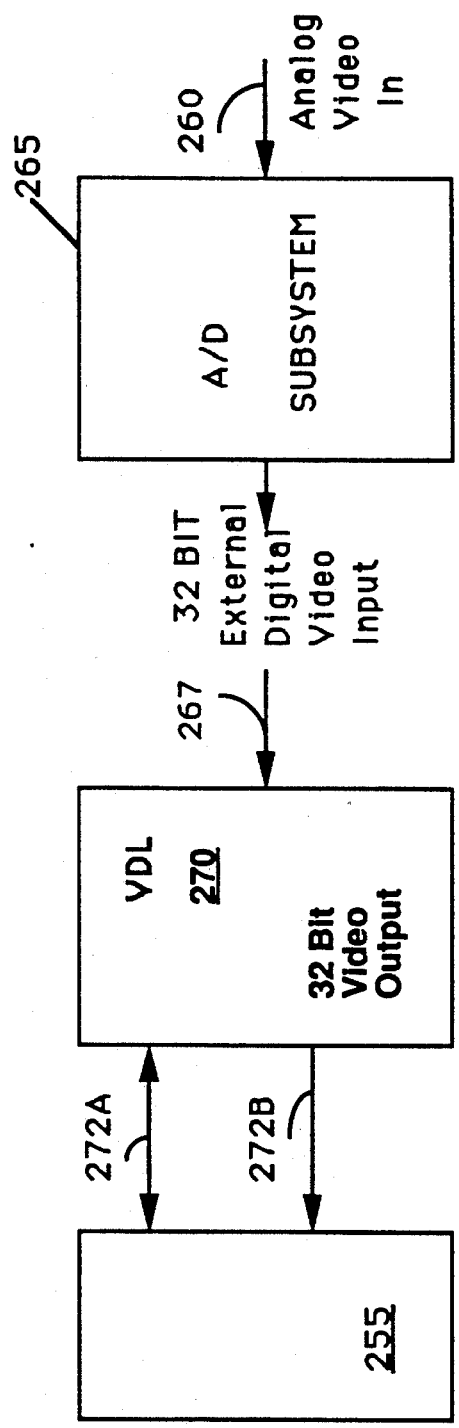
FIG. 3 is a block diagram of the input module of the video display system of the present invention illustrating signal flow.

Referring to FIG. 3, the data flow and signal flow for the input module 250 of FIG. 2 is illustrated in greater detail. The analog video input 260, can be live, from tape, laser disk, or other source. This analog video input signal is coupled to an analog to digital conversion subsystem 265 which converts the analog video input signal to a digital video input signal. Alternatively, the video input source can be a digital (D1) interface, in a serial digital format, or can be externally converted from analog to digital, prior to coupling to the input module 250, in which case the module 250 would not require the analog to digital subsystem. The external digital video input 267 is coupled to the video delay subsystem 270. The video delay system 270 is coupled to the video BUS main card connector 255, and provides a multiple bit video BUS, 32 bits in the illustrated embodiment, providing an alpha channel, red, green, blue, and a TDO bit from the video display system to the video BUS connector 230 for coupling to the main card 200 of the video processing subsystem 140. The video output 272B from the video delay subsystem 270 is illustrated in FIG. 3 as a 32 bit video output via BUS 272B. Additionally, the video BUS main card connector 255 provides coupling of control signals, video signals, clock signals and power from the main card 200 via the video BUS connectors 210, 230 and 255, for coupling via BUS 272A to the video delay subsystem 270. These signals include TMS, TMI, TCLK, JTAG control signals, and power signals, as will be described in greater detail hereinafter. BUS 272A provides a multiple-bit control BUS for passing signals from the main control card 200 to the input module 250 for programmable control of delay time value, masking values, and testing.

Figure 4:
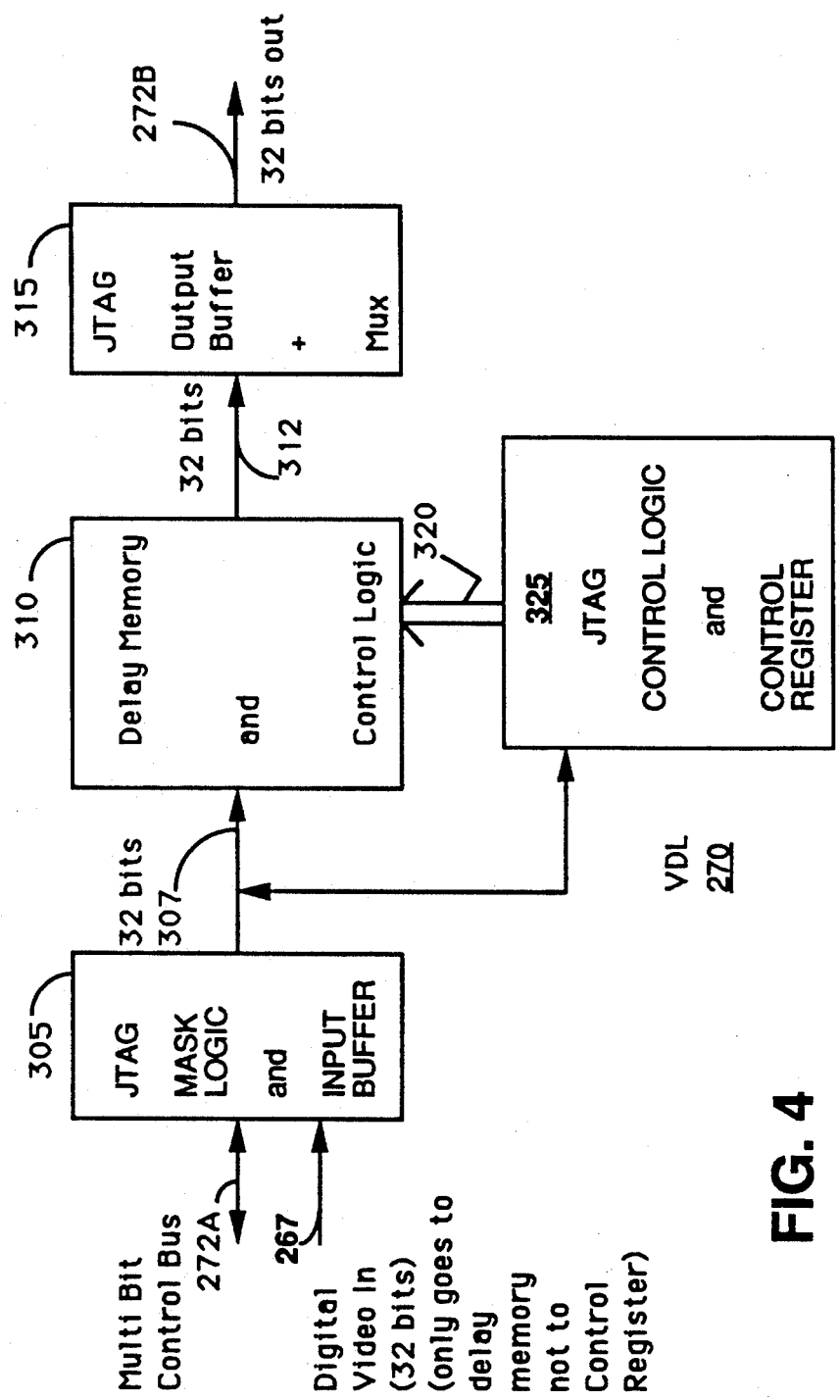
FIG. 4 is a detailed block diagram of the video delay means block of FIG. 3.

Referring to FIG. 4, a detailed block diagram of the video delay subsystem 270 is illustrated. An input interface 305 which includes JTAG interface circuitry, mask logic and input buffers is coupled to the digital video input 267 and to the multiple bit control BUS 272A. The input interface 305 provides a multiple-bit output coupled via BUS 307 to both a delay memory and control logic subsystem 310, and to a control register subsystem 325. Additionally, the delay memory and control logic 310 is coupled and interfaced via BUS 320 with the control register subsystem 325. The delay memory and control logic 310, responsive to output from the input interface 305 coupled via BUS 307, and also responsive to the control register subsystem 325, provides a multiple bit output, 32 bits in the illustrated embodiment, coupled via BUS 312 to an output interface subsystem 315 (which provides JTAG output buffers and multiplexer logic). The output 272B from the output interface 315 provides a multiple bit output, illustrated as 32 bits, which is coupled via BUS 272B to the main card 200 via the video BUS main card connector 255.

Figure 5A:
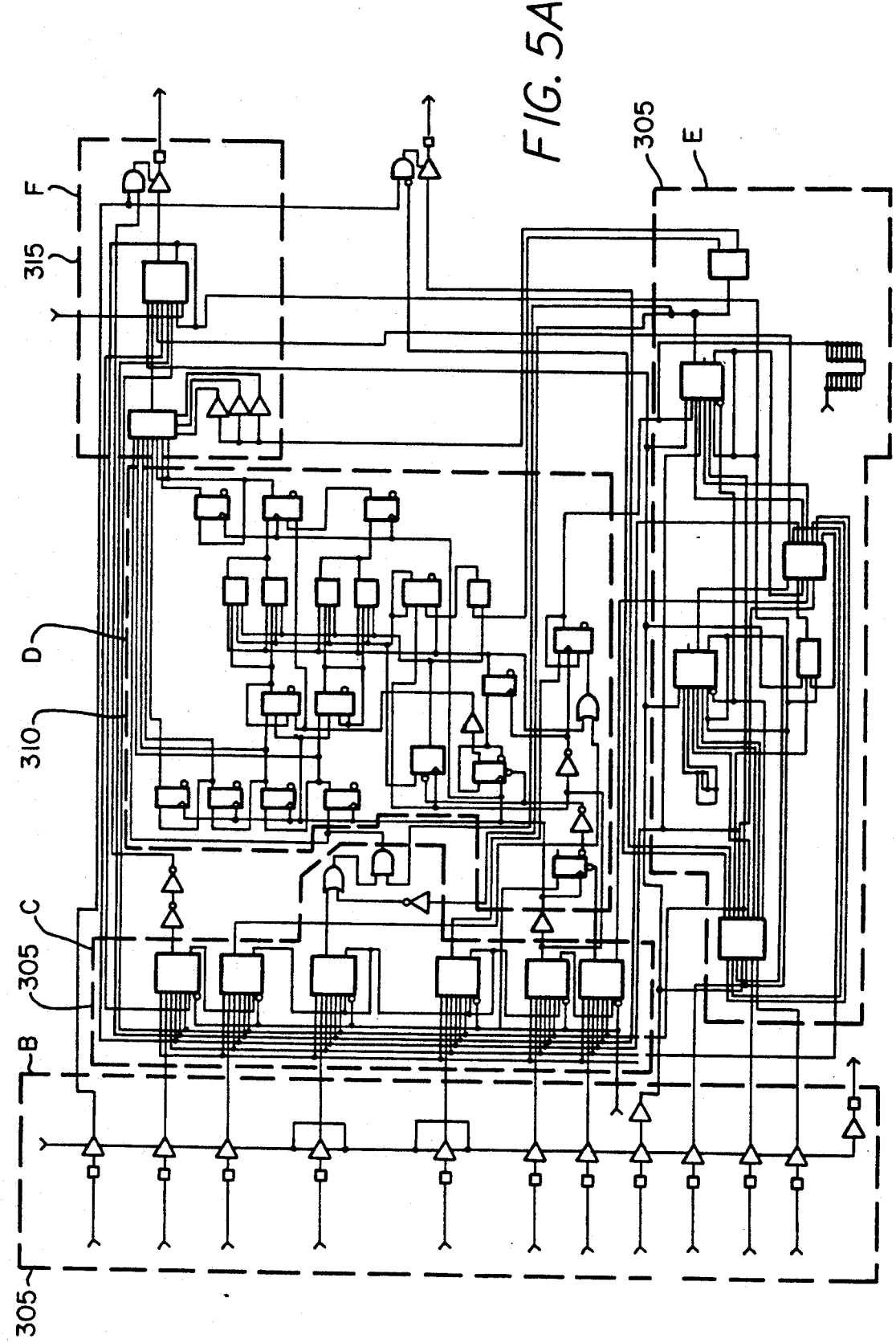
FIGS. 5A-F is a detailed electrical schematic drawing of the video delay system as illustrated in FIGS. 3 and 4.
Figure 5B:
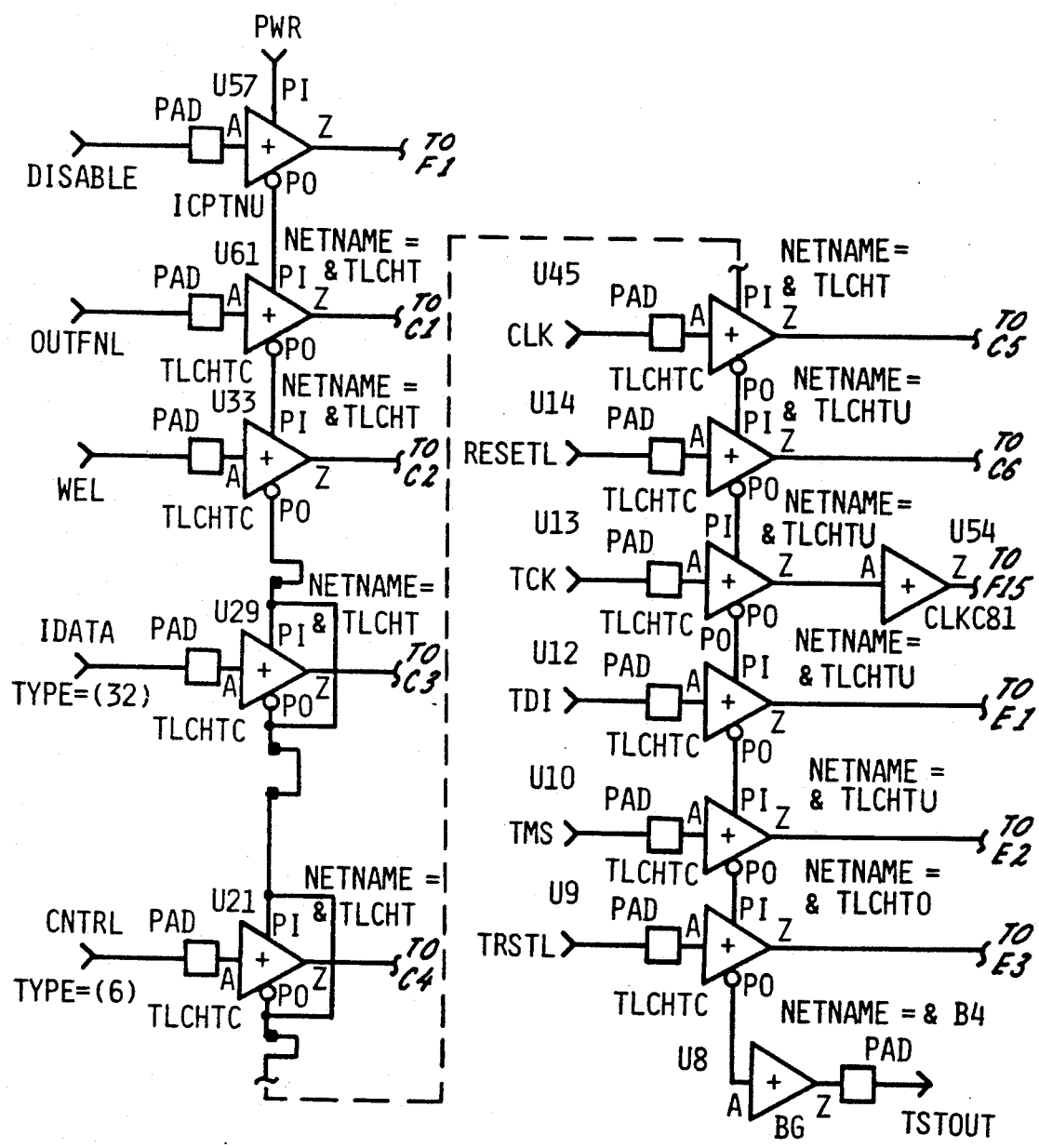
Figures 1, 5C:
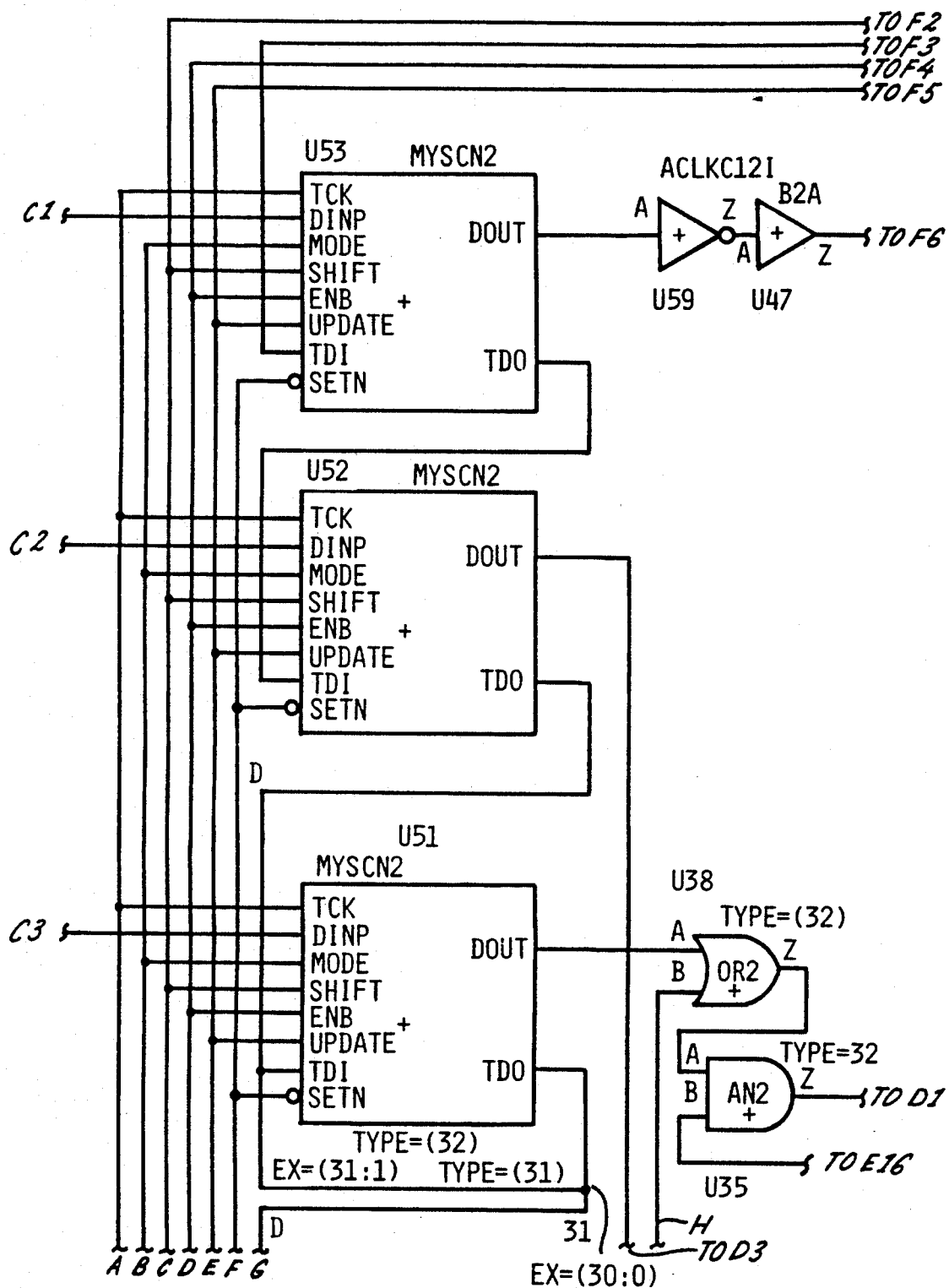
Figures 2, 5C:
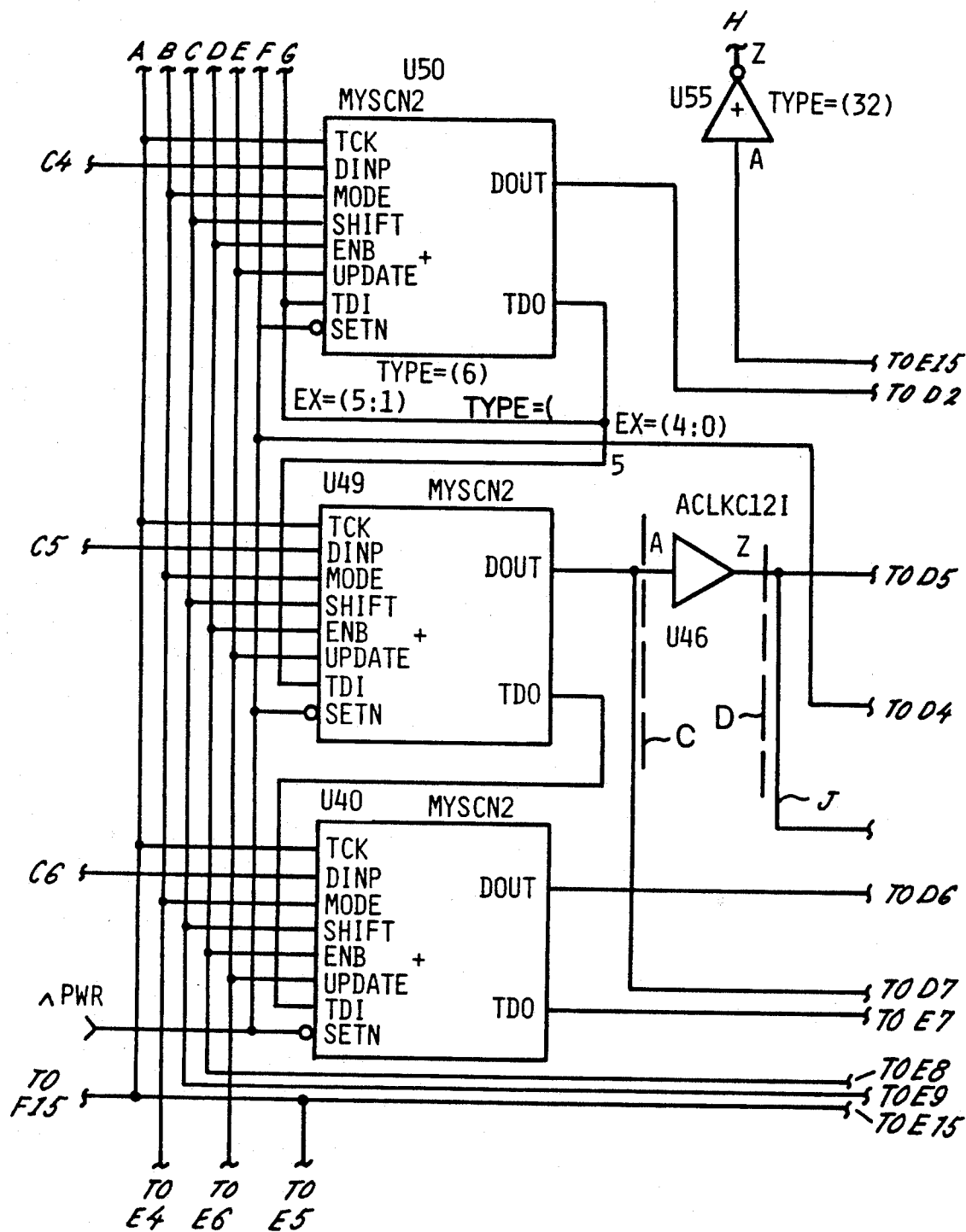
Figures 1, 5D:
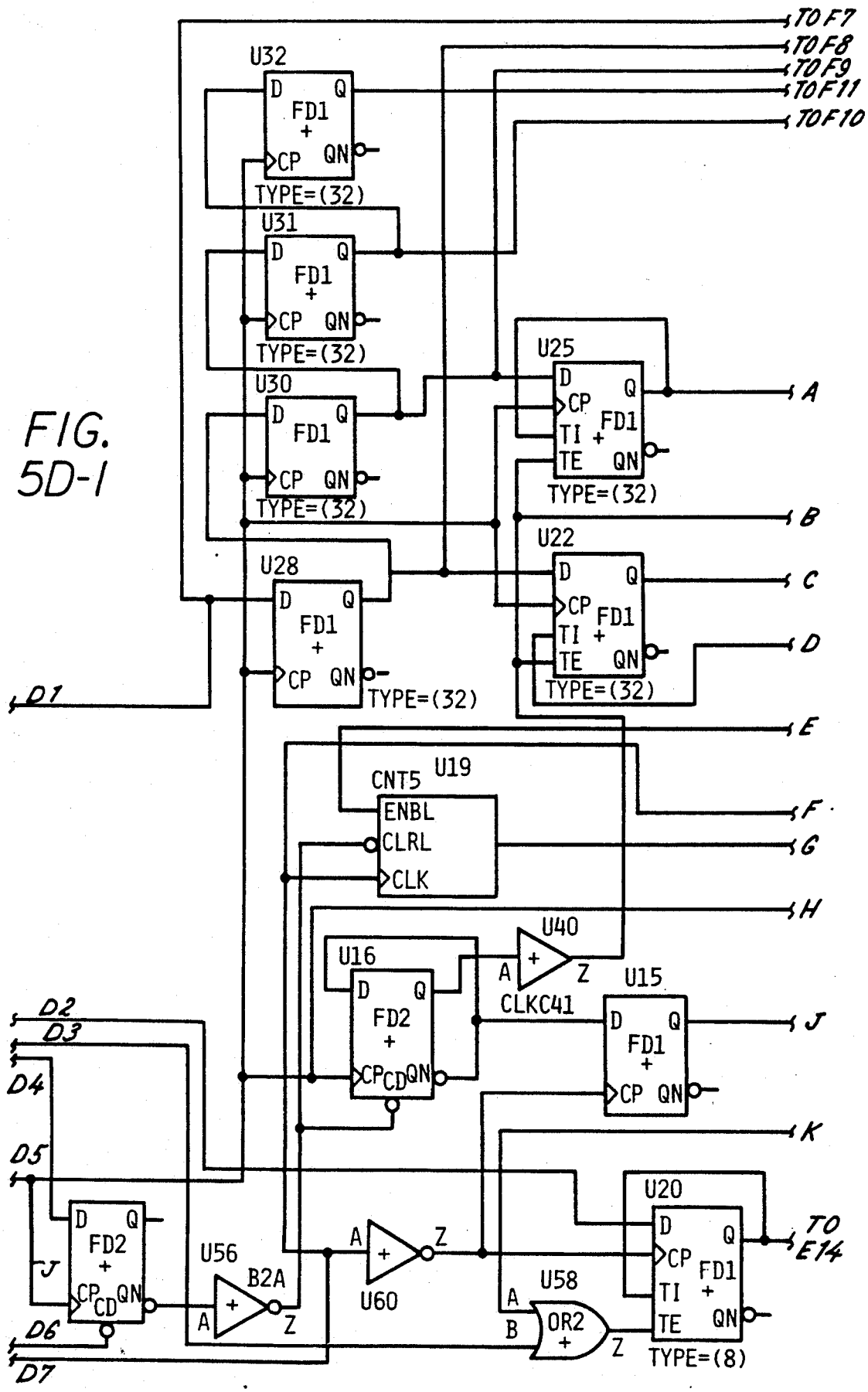
Figures 2, 5D:
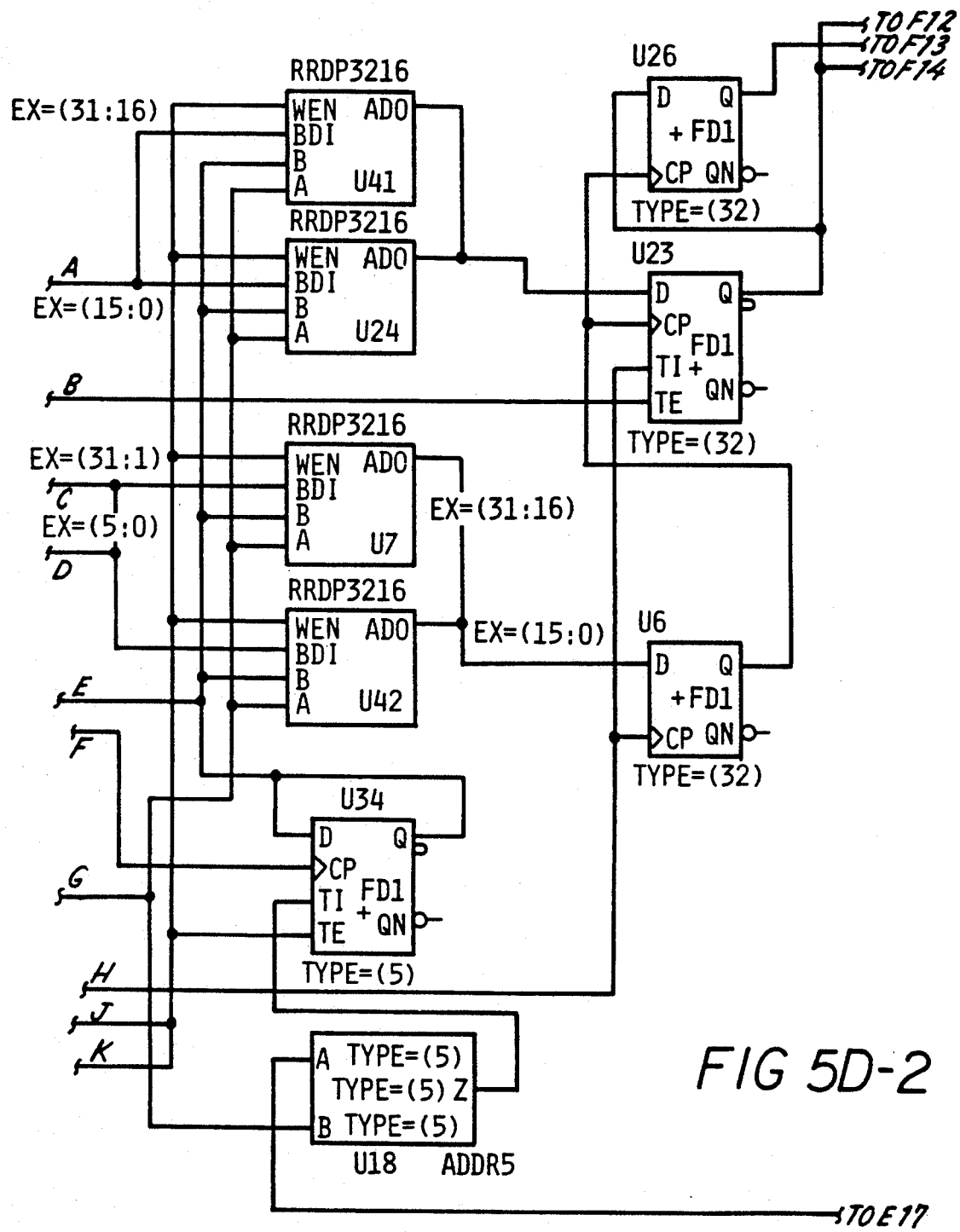
Figures 1, 5E:
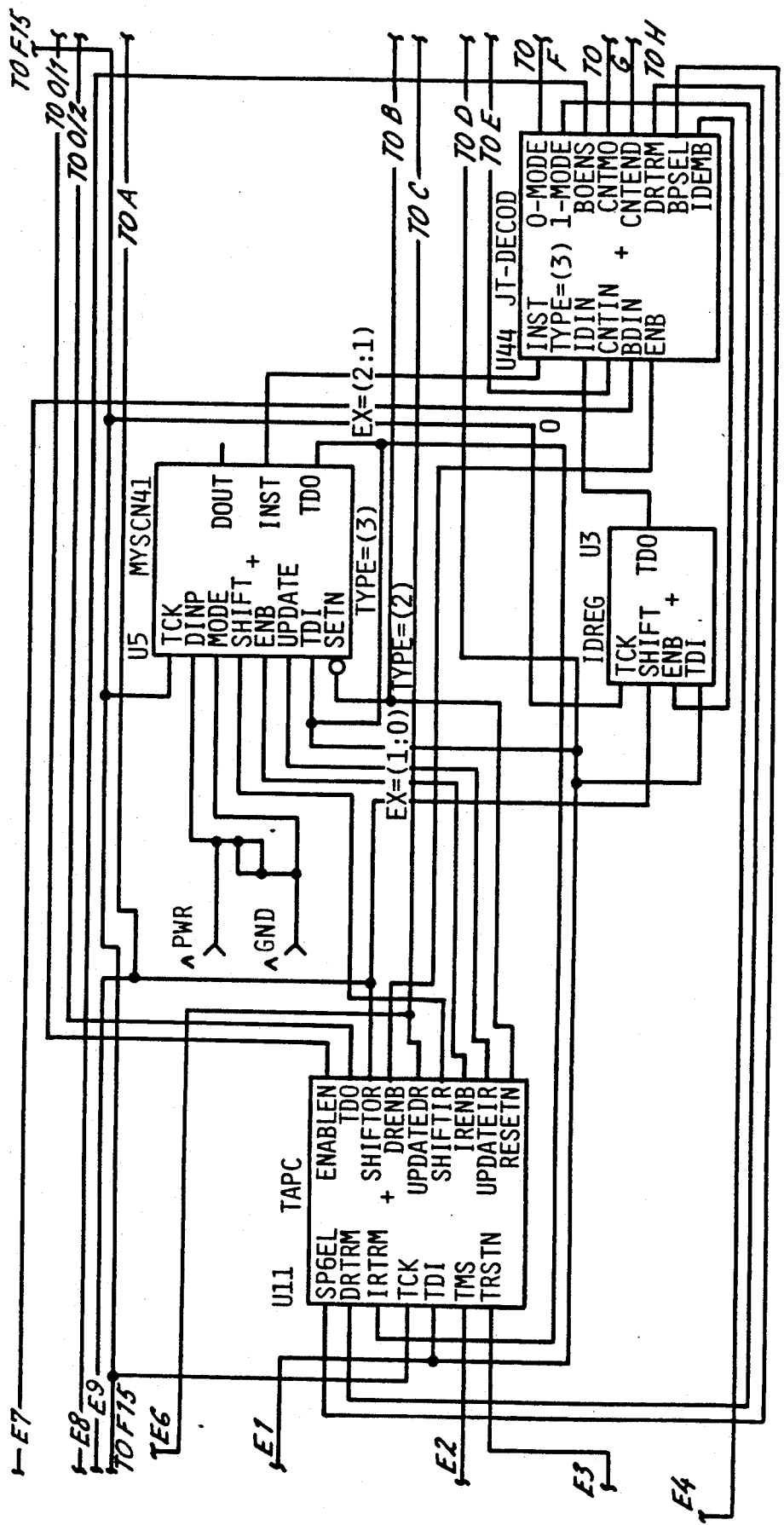
Figures 2, 5E:
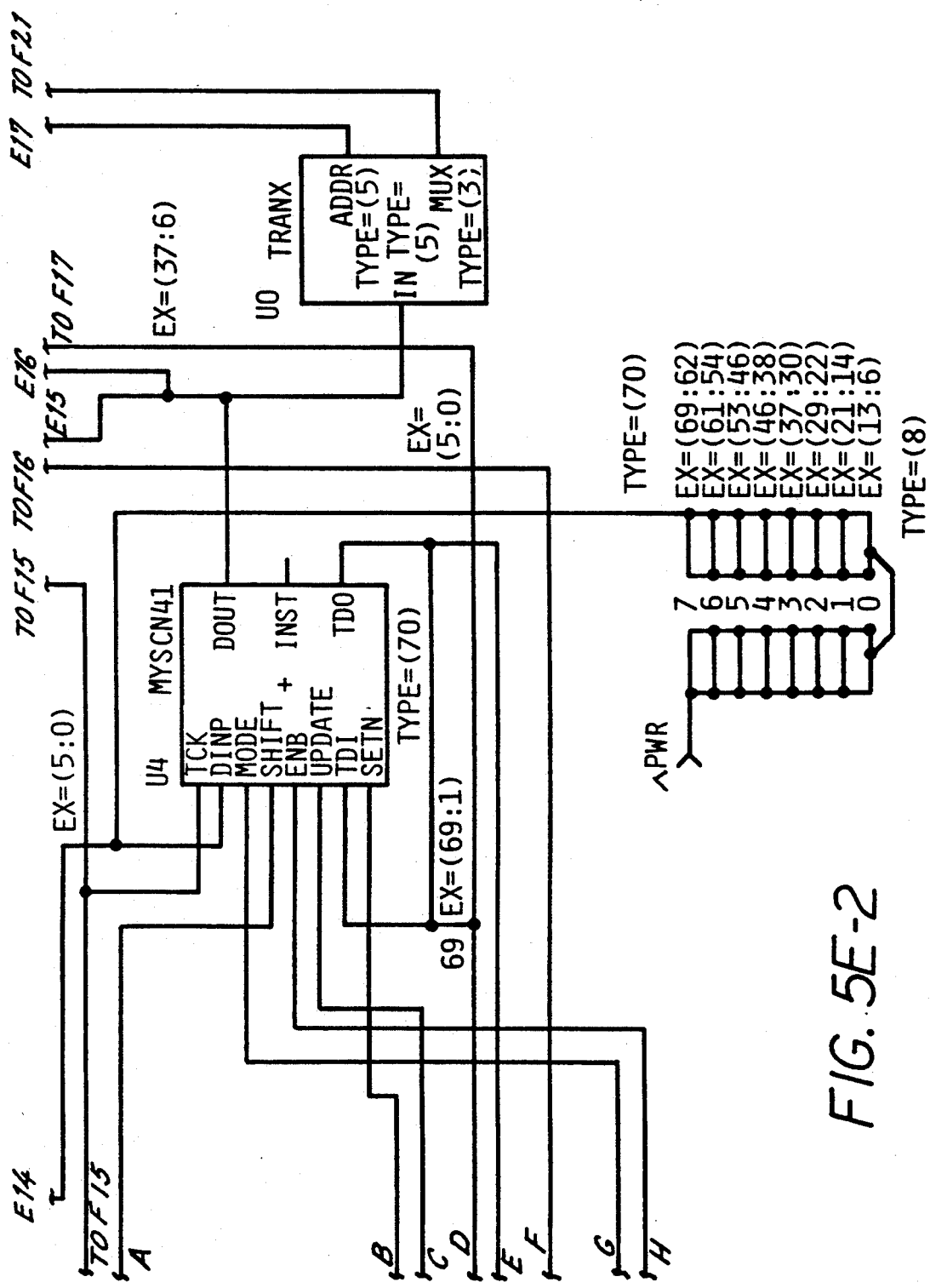
Figure 5F:
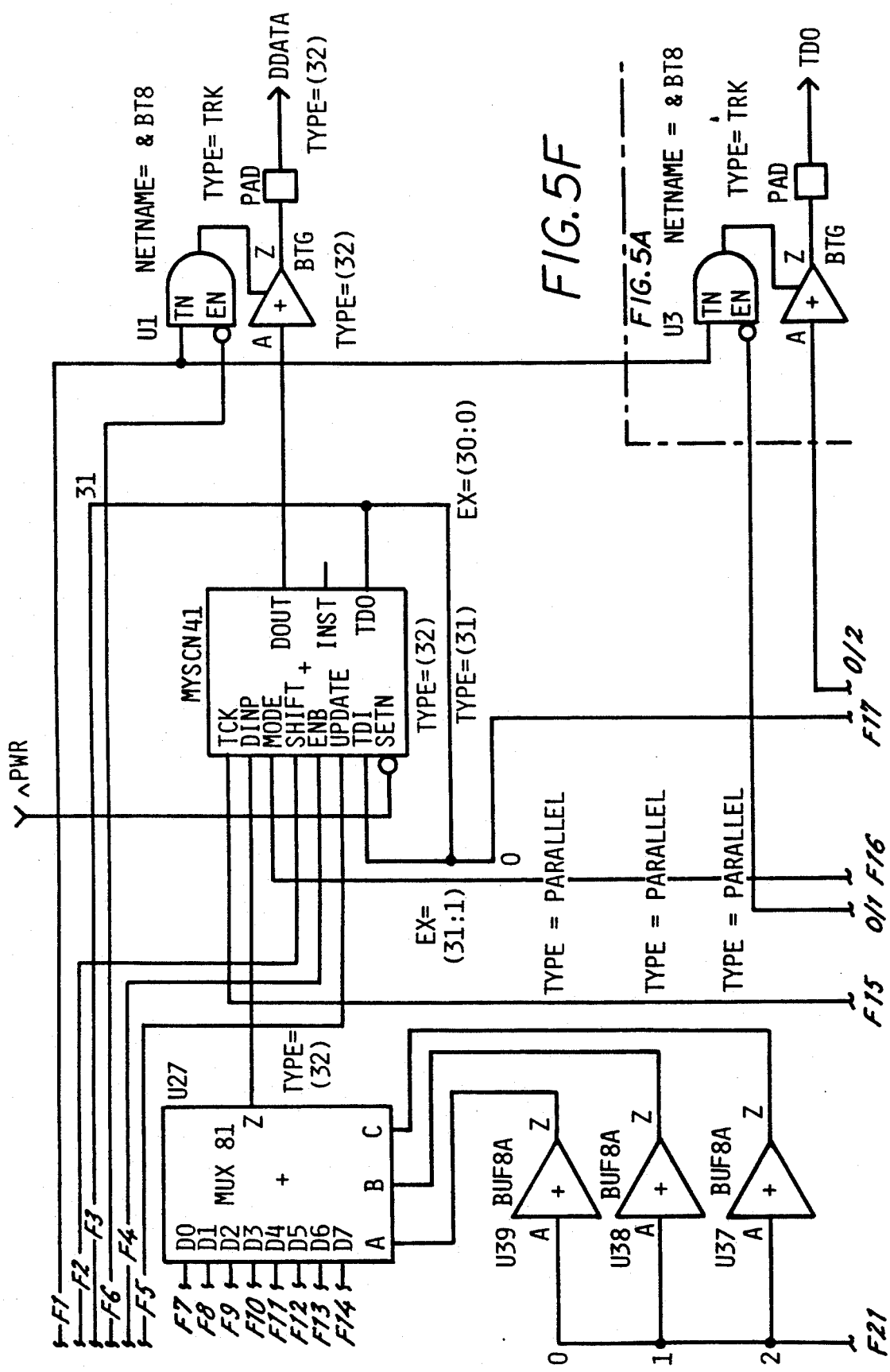

Referring to FIGS. 5A-E, a detailed electrical schematic drawing of the video delay subsystem 270 as illustrated in FIGS. 3 and 4 is provided. FIG. 5A is a complete subsystem diagram, with sections of FIG. 5A blocked in and marked "B," "C," "D," "E" and "F" to correspond to FIGS. 5B to 5F respectively, and with blocks functionally numbered (305, 310, 315 and 325) to correspond to the identically numbered functional blocks of FIG. 4. FIGS. 5B to 5F respectively, correspond identically, although enlarged to the sections "B" to "F" of FIG. 5A.

In the preferred embodiment, as illustrated in FIGS. 5A-F, the system of FIG. 5A is implemented as a single chip integrated circuit. The pinout, external signal interface, JTAG control cells, and mask functions for FIGS. 5A-F is provided hereinafter.

Pinout:

IData(0:31)

32 bit input data bus. Data on this bus is first delayed from 0 to 63 clock delays and then sent to OData(0:31). The amount of delay is controlled from bits 0:5 of the 70 bit control register.

For delays greater than zero, data is gated on the rising edge of CLK.

OData(0:31)

32 bit output data bus. This bus is tri-stated if either (OUTENL) or (Fac_Test) are active.

(OUTENL)

When active, disables OData output.

CLK

System clock, active on the rising edge.

(RESETL)

When active initializes VDL.

Parallel Load Controls:

(WEL)

When active, (and [TRSTL] is active or toggled), delay value on CTRL(0:5) is gated into Control Register bits(0:5) on the rising edge of CLK.

CTRL(0:5)

These control lines determine the delay count when the JTAG circuitry is inactive.

JTAG Interface:

TDI

Test Data in. This pin is disabled if (Fac_Test) is active.

TDO

Test Data out.

TCK

Test Clock

TMS

Test Mode Select (TRSTL)

JTAG Reset. This pin is used to reset the JTAG test logic. Once active, bits 6-69 (mask registers) are forced to ones (this disables the mask registers). The JTAG circuitry will remain inactive until (TRSTL) is inactive and the TCK, TMS and TDI control pins force JTAG active.

Miscellaneous Signals:

(Fac_Test)

Disables both the OData(0:32) bus and TDO outputs. This pin is used during the manufacturing process and should be tied high during normal operations.

TSTOUT

Parametric test pin. This pin is only used for parametric testing at the foundry and is not used during normal operations. It can be left unconnected during normal operations.

JTAG Control cells:

MYSCN2 Cells used to allow input data to pass through cell or capture input data on the fly. This block is controlled through JTAG. (See U53, U52, U51, U50, U49, U48 of FIGS. 5A-F.)

TAPC Test Access Port Controller. This is a state machine that controls all JTAG functions.

IDReg U2 Hardwired inside this register is the code used to identify the chip. This code is read only and can only be read through JTAG.

U44 Decodes the value in the Instruction Register (U5) to control the TAPC.

U5 Stores the 3 bit Instruction Register. After RESETL or TRSTL is active or toggled this register is initialized to 110 (where bit zero is LSB).

U4 Stores the 70 bit control register used to control the delay and mask values of the VDL. After RESETL or TRSTL is active or toggled (and WEL is active), this register is initialized as follows:

Bits 0-5 are set to values corresponding to bits 0-5 of CNTRL(0:5)

Bits 6-69 are forced to 1 (inactive).

U43 Controls if the ODATA bus is passed through or captured. This block is controlled through JTAG.

Mask Functions (control register bit definitions):

Bits 69-38 control when the ODATA bus is forced to ones. These mask bits connect to the OR gate U38. When these bits are zero, corresponding bits of the input data are forced to 1 regardless of the value on ODATA. When bits 69-38 are one the ODATA data is unaffected.

Bits 37-6 control when the ODATA bus is forced to zeros. These mask bits connect to the AND gate U35. When these bits are zero, corresponding bits of the input bus are forced to 0 regardless of the value on ODATA. When bits 37-6 are one, the ODATA data is unaffected.

All references to "JTAG" refer to IEEE Std. 1149.1-1990. Mux U27 is used to select between short delays of 0-4 and long delays of 5-63.

Register U20 holds a 6 bit delay value. The value on the CTRL(5:0) is loaded into this register whenever WEL is active. The value in this register is loaded into bits 0-5 of the control register when RESETL or TRSTL is active or toggled.

For delays longer than 4, a 32 bit wide by 64 deep delay RAM is used. Due to aspect ratios of the 32×64 memory and the size of the die used, the delay memory was broken into 4 memory slices U41, U24, U7, U42. Each memory element is 16 bits wide by 32 word deep.

The memories are loaded and read every other clock cycle, 64 bits at a time. Registers U22 and U25 set up two cycles worth of input data (64 Bits) to be read into the four memory banks. Registers U6, U23 read two cycles worth of data (64 Bits) and shifts the data out.

The CNT5 is a free running counter used to supply address to the "A" (i.e. Read) address of the memory bank. The value of this counter is added (using ADDR5) with the 6 bit delay value to supply the "B" (i.e. Write) address of the memory bank.

Due to the pipe line associated with using 4 dual port memories, delays of 1 to 4 cannot be derived from the dual port RAM implemented in this design. The delay registers U32, U31, U30, and U28 compensate for this by providing delays independent of the dual port RAM.

Figure 6:
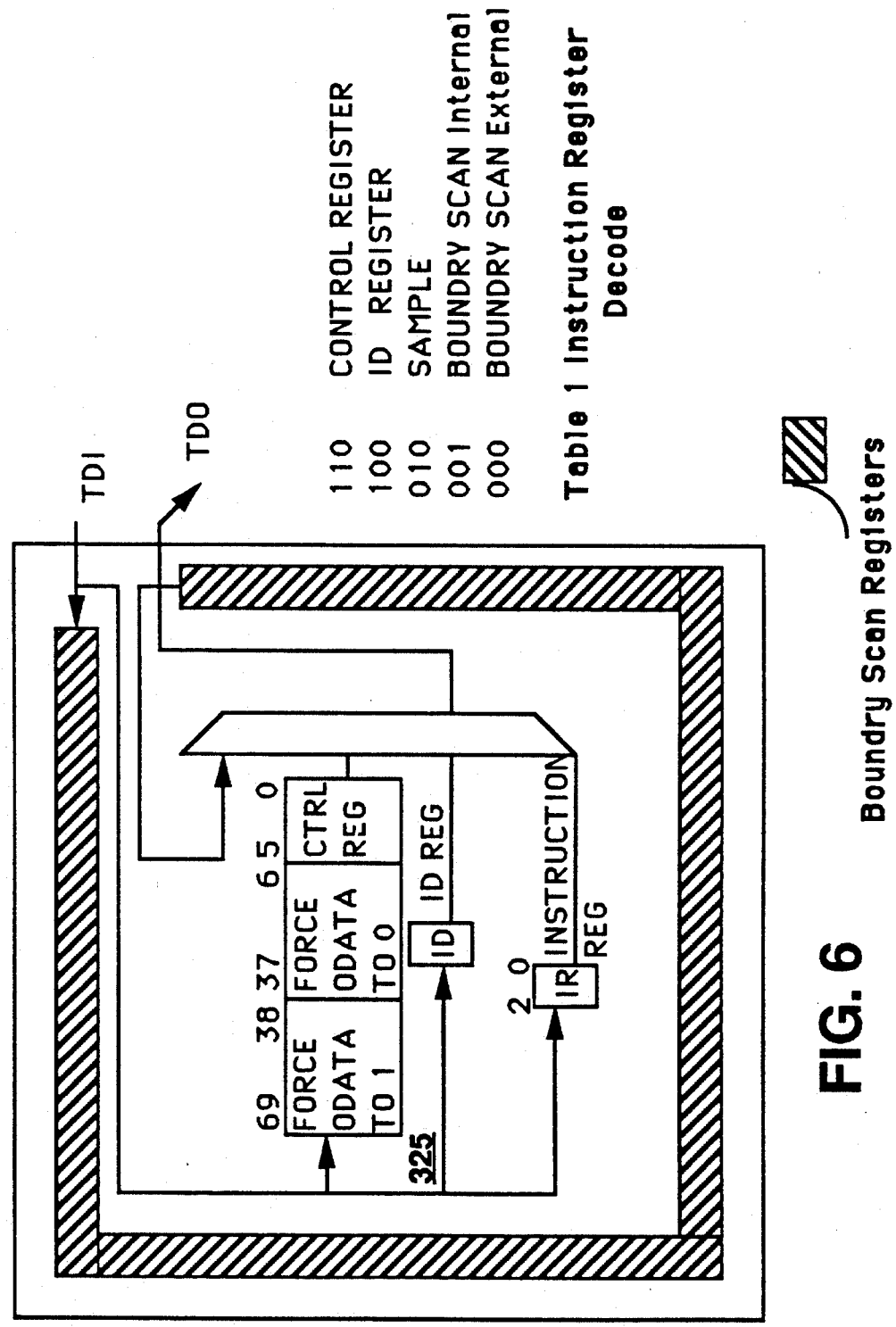
FIG. 6 is a detailed block diagram illustrating the instruction register and control registers for the video delay means.

Referring to FIG. 6, the control register 325 of FIGS. 5A and E are illustrated in greater detail.

The video delay system ("VDL") as illustrated in FIGS. 5A-F and 6, is controlled by a 70 bit control register 325. Bits 0-5 control the delay count, bits 6-37 form the active mask value, and (when 0) force corresponding bits on the ODATA(0:31) to zero. Bits 38-69 form the inactive mask value, and (when zero) force corresponding bits on the OData (0:31) to one.

Bits 0-5 control the delay of the VDL. With a delay of zero, data is propagated from the video data input IData (0:31) to video data output OData (0:31) without any clock delay. A delay value of one delays the propagation of the IData(0:31) to OData(0:31) by a one clock (CLK) delay. The IDATA(0:31) bus can be delayed from 0 to 63 clock delays.

If both mask bits are active, the corresponding OData bit is zero.

In the illustrated embodiment, Bits 6-69 can only be loaded by JTAG. When (TRSTL) is active these bits are forced inactive.

Figure 7:
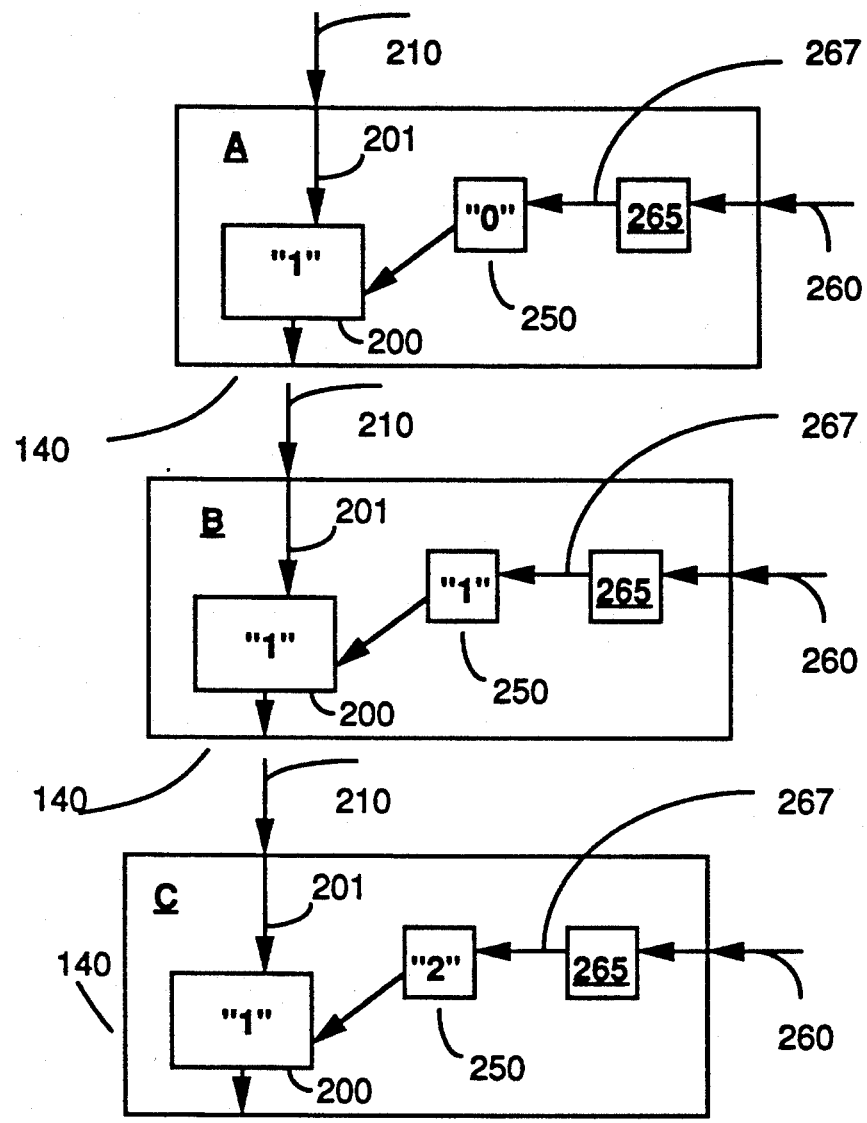
FIG. 7 illustrates a multiple card video processing system in block diagram form, illustrating the time compensation flow.

Referring to FIG. 7, a multiple card intercoupled video processing system is illustrated, illustrating the time compensation intercoupling programmable delay aspect of the present invention. As illustrated in FIG. 7, each video processing subsystem 140 includes a main board 200 and an input module 250 coupled thereto, corresponding to FIGS. 1 and 2. The main board provides means for processing video input data provided either through the video BUS, NUBUS, or from the input module to the main processing means 200 which programmably provides video processing functions responsive thereto and to control signals received via the JTAG interface, to provide video output data for coupling to the video BUS 210. The main board 200 adds a processing time delay in processing the video input data to provide video output data. This processing unit delay is equal to a 7 pixel delay in the illustrated embodiment where there is a 7 pixel pipeline structure. However, the invention is not limited to any particular fixed delay.

As illustrated in FIG. 7, there are three video processing subsystems, A, B, and C. The processing means 200 of each subsystem 140 adds one processing unit delay to the video data output relative to the corresponding video data input. Therefore, to provide time synchronization and compatibility with a real time external video source input coupled via respective external video inputs 260 to each of the subsystems 140 A, B, and C, it is necessary to program the delay means of the input module 250 to compensate for the cumulative processing unit delays added by processing means 200 of previous processing means in a related intercoupled chain. Thus, for subsystem 140A, a zero unit delay is programmed in the input module video delay means, since this is the first video input data and there is no previous processing unit delay to compensate for between the video input data 201A and the external source video input data 267A to the processing means 200A. However, a one unit delay is programmed to the delay means of the input module 250B for subsystem 140B to compensate for the processing delay of one added by subsystem 140A, so that the real time external video 267B coupled to subsystem 140B is programmably delayed to be processed at the proper time (e.g., blended, mixed, faded) with the video input 201B to the processing means 200B of subsystem 140B, as received via the video bus 210 as video output data from the processing means 200A of the previous subsystem 140A. Thus, the transformations and processing affected by the processing means 200A of subsystem 140A are synchronized to work properly and to be available simultaneously to the external video input 267B coupled to the input module 250B of subsystem 140B, so as to be processed properly and in synchronism by processing means 200B of subsystem 140B. In a similar manner, a two unit delay is programmed, responsive to the JTAG control signals, so as to compensate for the processing unit delays of processing means 200A and 200B of subsystems 140A and 140B, so that the external video source signals 267A and 267B coupled to those subsystems and delayed by those subsystems by one and two processing unit delays respectively, are synchronized so as to be properly processed in time synchronization with the real time external video input 267C to the input module 250C of subsystem 140C for processing by the processing means 200C of subsystem 140C. Thus, the delay means of the input module 250 for each respective subsystem (140A, B, and C), adds a programmable time delay (i.e., respectively 0, 1, and 2) to the respective external source video data input 267 from the external video source 260 for the respective subsystem prior to coupling the source video data input to the means for processing of video data 200 for that respective subsystem. The programmable time delays thus compensate for all previous video processing subsystem processing delays so as to time correlate and synchronize the external source video inputs with the video bus video inputs.

In an alternative embodiment, a second video delay means 250 is coupled to the video data input 201 and the means for processing video 200, and processes the video input data 201 prior to coupling it to the means for processing 200, as shown in dashed lines in FIG. 7.

Figure 8:
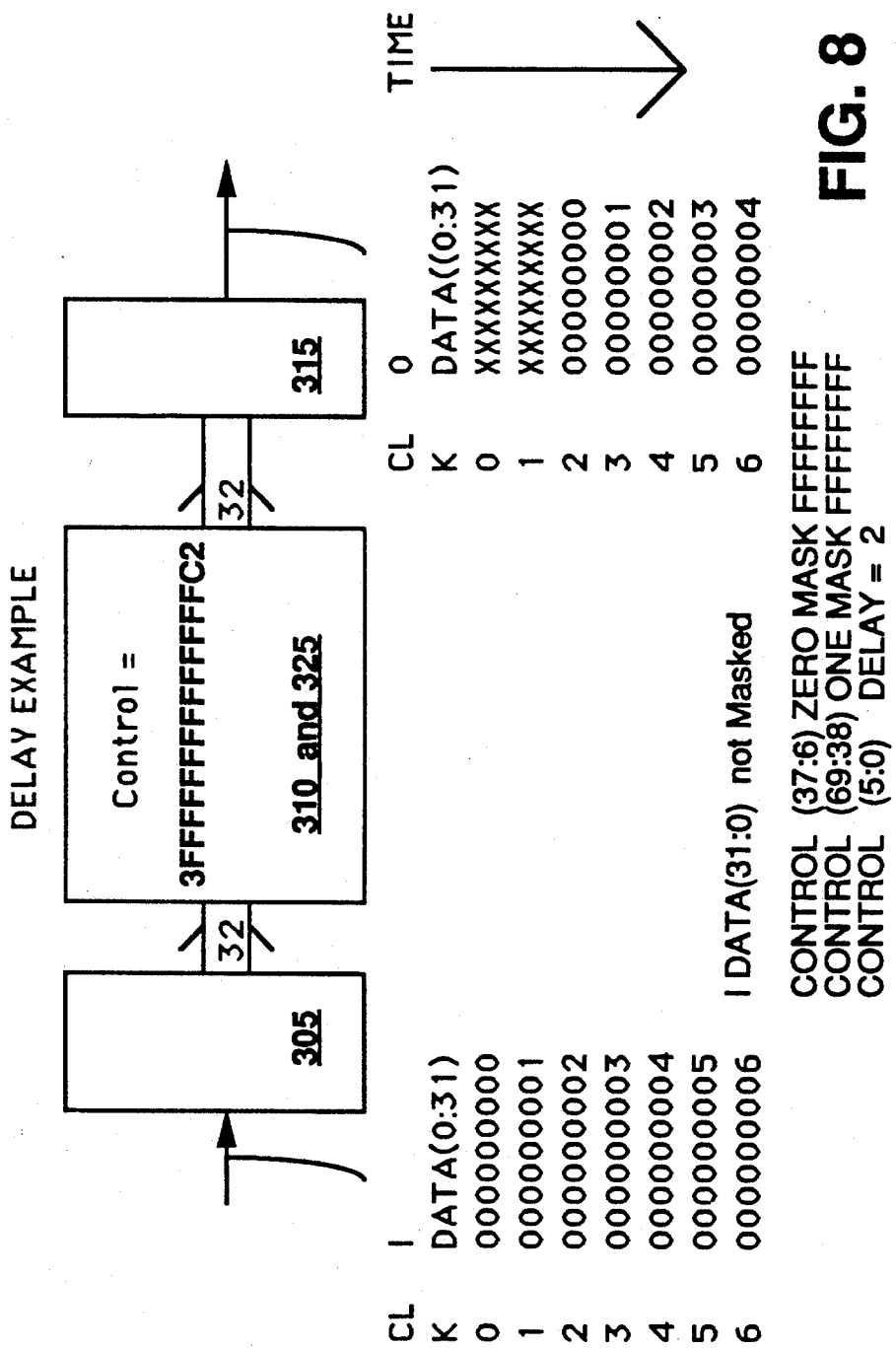
FIG. 8 is a data/time flow block diagram illustrating a delay example for delay equals 2; and, FIGS. 9, 10 and 11 illustrate data/time flow block diagrams of mask examples, where delays equal 2 for FIG. 9 and equals 0 for FIGS. 10 and 11, with a zero mask equal to FFFFFF03, and a one mask equals 000000FF masks, where the input data stream for the mask examples of FIGS. 9 to 11 each provide examples of different data streams in, with the output data stream showing the resulting output from the masking function performed by the video display system of the present invention.

FIG. 8 illustrates the data time flow block diagram for the delay means 270 illustrated in FIGS. 3-6, for a delay example having a delay value equal to 2. The drawing shows that for clocks 0 to 6, corresponding to time flow in an increasing dimension, input video data bits 0-31 having values 0, 1, 2, 3, 4, 5 and 6, for corresponding clock cycles, are coupled to the JTAG mask logic and input buffer subsystem 305, and coupled therefrom to the delay memory, control logic and control register 310 and 325. The control register 70 bit value is equal to 3FFFFFFFFFFFFFFFC2. The output from the delay memory, control logic and control register 310 and 325 is coupled to output buffer and multiplexer 315 which provides video data output, ODATA 0-31 which as illustrated shows that corresponding to input data, the output data is delayed for two clocks. Prior to that delay, initially, the output is undetermined (illustrated as X). For clock 2, ODATA is a value of 0, corresponding to a delay of 2 from the input data value. For clock 3, the ODATA value equals 1; for clock 4 the value equals 2; for clock 5 the value equals 3; and for clock 6, the value equals 4; all being delayed 2 clocks from the corresponding input data value. Since the control register bits 0-5 equal 2, the delay equals 2. Since the control register bits 6-37, corresponding to the 0 or active mask, are all equal to F's, or 1's, the incoming data has no zero mask, and similarly since control register bits 38-69 are all 1's or F's, the one mask is inactive. Therefore, the incoming data, IDATA 31:0 is not masked and is delayed by a count of 2.

Figure 9:
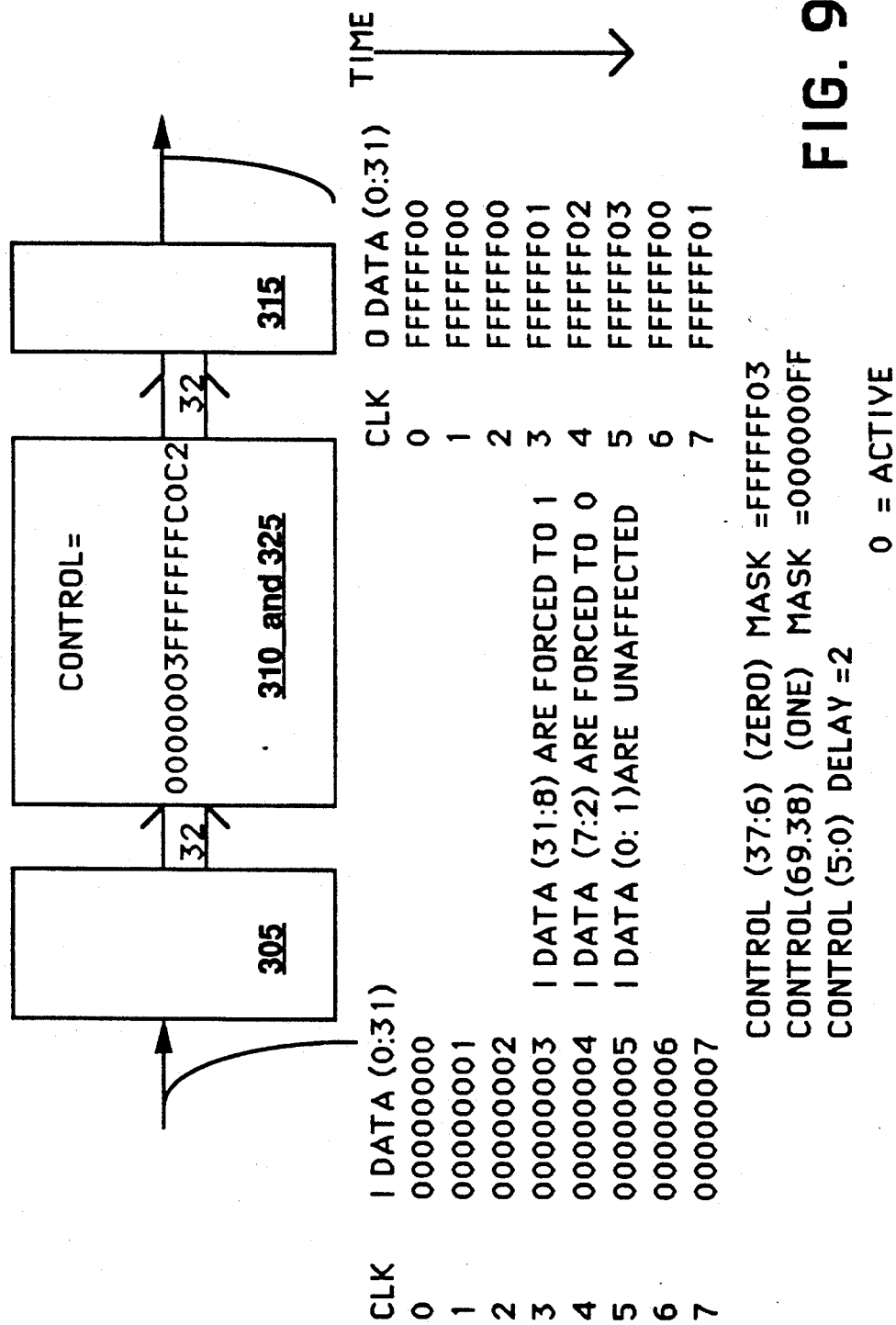
Figure 10:
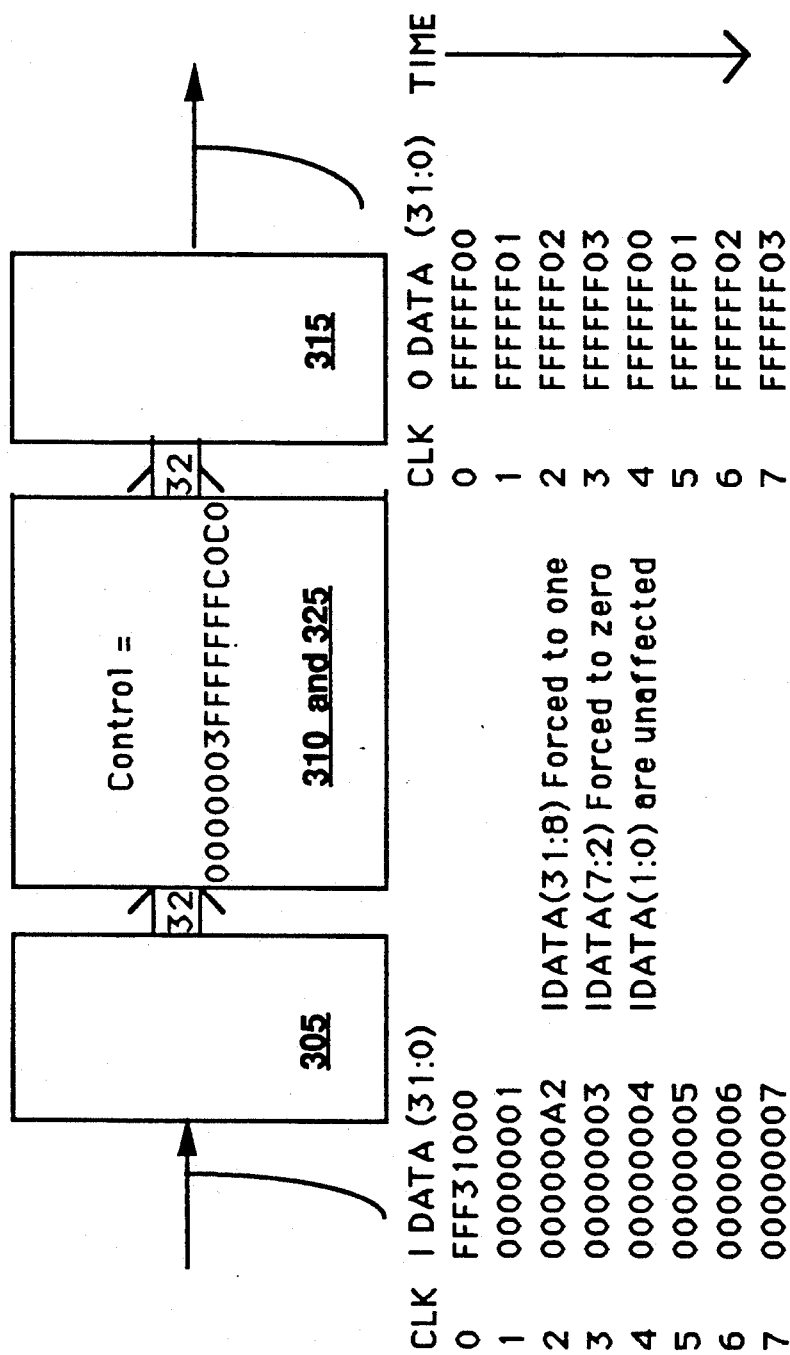

Referring to FIGS. 9, 10, and data/time flow block diagrams of masking examples, corresponding to the delay example of FIG. 8 are illustrated, where the delay equals 2 for FIG. 9, and equals 0 for FIGS. 10 and 11, since the control register bits 0-5 equals 2 for FIG. 9 and equals 0 or FIGS. 10 and 11. FIG. 9 illustrates a 0 mask equals FFFFFF03, and a 1 mask equals 000000FF, resulting in the incoming data bits 0-1 being unaffected by either masking operation, bits 2-7 being forced to 0 always, and bits 8-31 being forced to 1 always, with a delay of 2 from input to output. The masking effect is immediate so that at clock 0 the output data bits 2-31 are immediately masked and the mask is applied. The mask in combination with the delay, causes the least significant bits, 0 and 1, to be delayed by 2 clocks and to follow the least significant incoming data bits 0 and 1. With the masking forcing bits 2-7 to 0, the output data at clocks 5, 6 and 7 are truncated in effect to limit the values to 1, 2, 3 and 0. In FIG. 10, the delay is equal to 0, the control register bit 0 to 5 being equal to 0. The 0 mask and 1 masks are identical to that for FIG. 9. Thus, output data bits 2-7 are always 0 and output data bits 8-31 are always 1, so that only output data bits 0 and 1 can track and follow input data bits 0 and 1. The result is as illustrated in FIG. 10, wherein the least significant output data bits 0 and 1 simultaneously track the corresponding input data bits 0 and 1 so that during the same clock cycle they have the same value.

Referring to FIG. 11, a delay equal to 0 is illustrated where control register bit 0-5 equals 0, and the 0 mask and 1 mask control register bits are identical to those as described in FIGS. 9 and 10. FIG. 11 differs from FIG. 10, in that the input data signal pattern is different to illustrate the masking effect on differing patterns. Note that the masking functions forced the values for output data bits 2-31 (being forced and controlled by the masking), with the output data bits 0 and 1 tracking at the same clock times the same values as the input data bits 0 and 1, for a delay equal to 0 as illustrated in FIG. 11.

While there have been described herein specific illustrated embodiments, it will be appreciated by one skilled in the art that various other embodiments and embellishments become clear upon reading of the description in conjunction with the drawings and the claims. Thus, the description and drawings are not meant to limit the scope of the invention, which is as set forth in the appended claims.

What is claimed is:

1. A video display system comprising:

a video bus;

a plurality of video processing subsystems each coupled to the video bus, each subsystem comprising an external video data input, a bus video data input, an external video data output, and a bus video data output, each subsystem providing means for processing of video data received from at least one of said external video data input and said bus video data input and providing respective video data output to at least one of said external video data output and said bus video data output responsive to control data output from at least one of said subsystems;

wherein at least two of the video processing subsystems are inter-coupled wherein the bus video data output is provided from one of the video processing subsystems and coupled via the video bus to a subsequent one of the video processing subsystems as said bus video data input thereto;

wherein each means for processing provides a predefined processing time delay between its respective ones of said video data inputs and its corresponding respective ones of said video data outputs, wherein each video processing subsystem is further comprised of delay means for adding a programmable time delay to at least one of its respective ones of said video data inputs prior to coupling the respective video data inputs to the means for processing of video data.

2. The system as in claim 1, wherein there are a plurality of video processing subsystems intercoupled via the video bus to provide video data output to the subsequent subsystem's video data input, wherein the delay programmed for each subsequent one of the delay means is adequate to compensate for all previous video processing subsystems processing delays, so as to time correlate the video data inputs and outputs.

3. The system as in claim 1 further comprising:

video bus interface means for coupling video data input and output signals between the intercoupled ones of the video processing subsystems.

4. A video display system as in claim 1, wherein the processing time delay is a constant time delay.

5. The video display system as in claim 4, further characterized in that each video processing subsystem operates so as to add one processing unit delay between the video data input to the respective video processing subsystem and the video data output from the respective video processing subsystem, further characterized in that the video data input and output signals are comprised of pixel data having an associated fixed pixel delay, wherein the processing unit delay is equal to a multiple of pixel delays.

6. The system as in claim 5, further comprising:

input means for providing control signals;

wherein the programmable delay means is further comprised of a control register responsive to said control signal for providing a selectively programmable time delay value.

7. The system as in claim 6, further comprising:

means for providing a clock signal cycling at a fixed period, wherein the time delay is equal to the clock signal fixed period multiplied by the programmable time delay value.

8. The system as in claim 1, further characterized in that said delay means further provides means for selectively masking video data input so as to provide selectively masked video data output responsive to said control signals.

9. The system as in claim 6, wherein at least one of the intercoupled video processing subsystem is coupled to an external video source to receive video data input therefrom, wherein the respective delay means for said external video source is selectively programmable responsive to the control signal, to delay the source video data input from the external video source so as to time synchronize it to the respective video data input from the video bus prior to coupling the video data inputs from the external source and the video bus to the means for processing.

10. The system as in claim 9 wherein the means for processing of video data is further comprised of means for providing at least one video effect, on a pixel by pixel basis, on the external video source and video bus video data inputs.

11. The system as in claim 10, wherein there is a plurality of different video effects which can alternatively and selectively be applied on a pixel by pixel basis.

12. The system as in claim 11, wherein the different video effects are comprised of at least two video effects of: blend, fade, mix, wipe, mosaic, posterization and solarization.

13. The system as in claim 9 wherein the external video source is comprised of at least one of video camera, video tape deck, computer, and laser disk.

14. The system as in claim 6, for receiving a clock signal and a command signal;
wherein the input means for providing the control signal output is responsive to the command and clock signals.

15. The system as in claim 14, wherein said input means is comprised of a serial interface.

16. The system as in claim 14, wherein said input means is comprised of a parallel interface.

17. The system as in claim 1, wherein said video data input signal is a multiple bit digital signal.

18. The system as in claim 1, wherein said video data output is a multiple bit digital signal.

19. A video display system comprising:
a video bus;
multiple video processing subsystems for receiving video input data and providing video output data, each coupled for communications via said video bus, each providing means for processing of video input data to provide video output data, each video processing subsystem being coupled to an external video source which outputs source video data input, each subsystem comprising an external video data input, a bus video data input, an external video data output, and a bus video data output, each subsystem providing means for processing of video data received from at least one of said external video data input and said bus video data input and providing respective video data output from at least one of said external video data output and said bus video data output responsive to control data output from at least one of said subsystem;
wherein said video bus provides means for coupling of said bus video data input said bus video data output, and said control data;
wherein video data output from a previous one of the video processing subsystems is coupled by the video bus as video data input to another one of the video processing subsystems,
wherein each video processing subsystem provides a processing time delay between its respective one of said video input data from the external video source and its respective corresponding output of video output data to the video bus,
wherein each of the video processing subsystems is further comprised of delay means for adding a programmable time delay to its respective one of said source video data input from the external video source prior to coupling the source video data input to the means for processing of video.

20. The system as in claim 19, wherein the programmable time delay is selected so as to compensate for the previous video processing subsystems processing delays, so as to time correlate and synchronize the source video input data from the external video source and the corresponding video input data from the video bus.

21. The system as in claim 20, further comprising:
means for providing a control signal, wherein said programmable time delay is set responsive to said control signal.

22. A video control system, comprising:
(a) control input means for receiving externally supplied control signals;
(b) video bus input means for receiving an externally supplied multiple bit bus video input signal;
(c) means for receiving a source video data input signal from an external video source;
(d) video processing means for providing a multiple bit video output signal responsive to at least one of the source and bus video input signals, and to the control signals,
wherein the video processing means is further comprised of:
delay means for selectively delaying one of the source and bus video input signals and providing the video output data time delayed relative to the video input data, responsive to the control signals; and
first masking means for selectively forcing certain ones of said multiple bits of said video output signal to an active logic level, responsive to the control signals.

23. The system as in claim 22, wherein the control signals are JTAG.

24. The system as in claim 22, wherein the control signals are IMBUS.

25. The system as in claim 22, wherein the multiple bit video input signal is 32 bits.

26. The system as in claim 22, wherein the multiple bit video output signal is 32 bits.

27. The system as in claim 22, wherein video processing means is further comprised of:
control register means, responsive to the control signals, comprising three sections, one for storing a delay value, one for storing an active masking value, and one for storing an inactive masking value;
wherein the delay means is responsive to the delay value for determining the amount of delay;
wherein the first masking means is responsive to the active mask value; and
wherein the second masking means is responsive to the inactive mask value.

28. The system as in claim 22, wherein when both the first and second masking means select the same bit, the active mask takes precedence.

29. The system as in claim 22, wherein the delay means and first and second masking means can function simultaneously on the same video input data.

30. An interface system comprising:

a video bus for coupling of video bus data signals;

multiple video processing systems, each of which performs video processing on its respective ones of multiple bit video input signals from at least one of an external video data input and a video bus data input, to produce its own respective one of multiple bit video output signals which are time-delayed by a predefined amount relative to its respective one of the corresponding video input signal;

wherein each video processing system further includes a delay subsystem for selectively adding a programmed time-delay to one of its respective video input signals responsive to a delay control signal;

wherein the video output of a first of said video processing systems, is coupled as the video input signal to a second one of said video processing systems, means for providing a delay control signal for the second processing system selected to produce a delay equal to the predefined amount for said first video processing system.

31. The system as in claim 30, wherein each video processing system can have a unique and different predefined amount of delay.

* * * * *